UNITED STATES PATENT OFFICE.

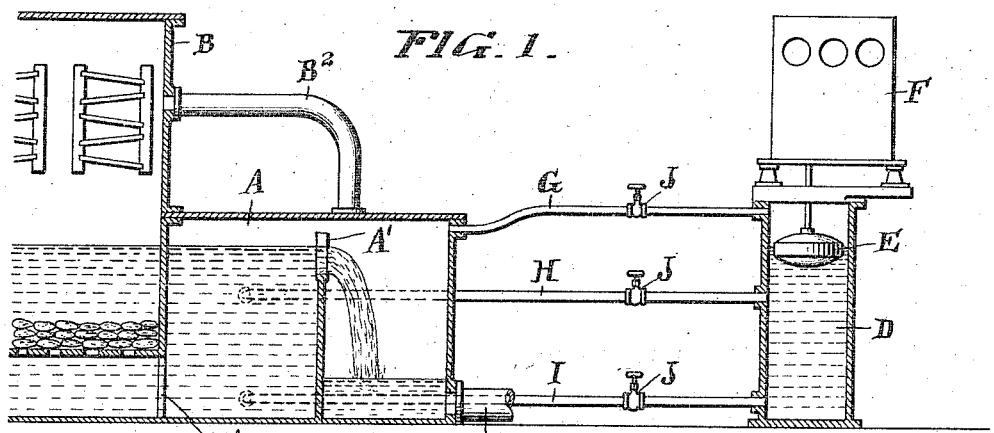
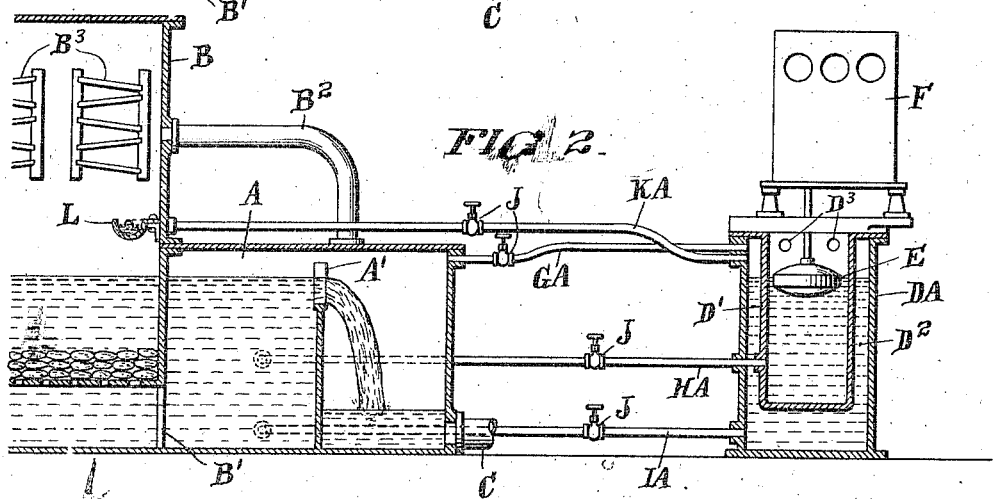
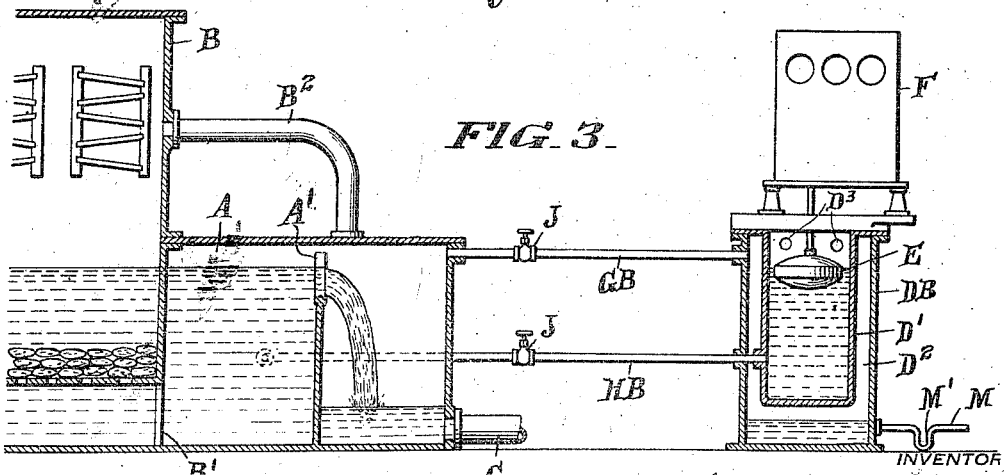

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, AS FIRM OF HARRISON SAFETY BOILER WORKS, OF PHILADELPHIA, PENNSYLVANIA.

MEASURING APPARATUS.

1,078,669.  Specification of Letters Patent.  Patented Nov. 18, 1913.

Application filed February 20, 1913. Serial No. 749,604.

*To all whom it may concern:*

Be it known that I, JOSEPH W. GAMBLE, a citizen of the United States of America, residing in the city and county of Philadelphia, in the State of Pennsylvania, have invented certain new and useful Improvements in Measuring Apparatus, of which the following is a true and exact description, reference being had to the accompanying drawings, which form a part thereof.

My present invention relates to liquid measuring apparatus, and particularly to liquid measuring apparatus of the kind in which the amount of liquid passing through a weir chamber is measured by measuring the variations in the accumulation of liquid on the supply side of the weir; and the invention is primarily devised for use in apparatus for measuring the flow of water which has been heated for boiler feed or like purposes. With such apparatus it is frequently desirable to measure the variation in accumulation of water on the supply side of the weir, not in the weir chamber but in a supplemental measuring tank connected thereto, but located at some distance therefrom, where it is more convenient to place the recording or indicating mechanism or the actuating means therefor. With such apparatus, if the temperature of the water in the measuring tank varies appreciably from the temperature of the water flowing over the weir, there results a difference in density of the water in the weir chamber and measuring tank which interferes with the accuracy of the measurements obtained.

The object of my present invention is to provide means for maintaining the water in the measuring tank at a temperature which is the same as or closely approximates the temperature of the liquid flowing over the weir. This I accomplish by providing means for obtaining a continuous circulation through the measuring tank of the liquid flowing over the weir, or in some cases of the steam or vapor filling the upper portion of the weir chamber.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described various forms in which my invention may be embodied.

Of the drawings: Figure 1 is a sectional elevation of one form of apparatus embodying my invention; and Figs. 2 and 3 are views each taken similarly to Fig. 1, and each showing a different modification.

In the drawings and referring first to Fig. 1, A represents a weir chamber divided into inlet and outlet compartments by a weir A'. In the form shown, although this is not essential to the present invention, the weir chamber is directly connected to a water heater B of the open feed water heater type from which heated water passes into the inlet compartment of the weir chamber through the port B'. C represents the discharge pipe leading from the outlet compartment of the weir chamber to a boiler feed pump or other device for handling or utilizing the measured water. As shown, the upper ends of the heater and weir chambers are connected by a vapor equalizing pipe $B^2$. The rate of flow of the liquid passing over the weir A' is measured by means of a float E which works in a measuring tank D and is connected to and operates the usual indicating, recording, or registering mechanism located within a casing F. As shown in Fig. 1 the interior of the measuring tank forms a measuring compartment connected to the inlet compartment of the weir chamber by the horizontal water pipe H, and also by the vapor equalizing pipe G located above the maximum water level in the weir chamber and measuring tank. As shown the ends of the water pipe H are connected to the inlet compartment of the weir chamber and measuring tank at levels slightly below the lowermost level of flow over the weir. The pipe connections H and G will obviously serve to equalize the water levels in the inlet compartment of the weir chamber and the measuring tank so long as the water in the weir chamber and measuring tank are at the same temperature. A difference in temperature of the water in the two places creates a difference in density which will make the water level in the measuring tank higher or lower than the level of water in the inlet compartment of the weir chamber accordingly as the last mentioned water is colder or hotter than the water in the measuring tank. To restrict any inaccuracies in the measurements obtained, due to this cause, I provide in the construction shown in Fig. 1, a horizontal water pipe connection I between the inlet compartment of the weir chamber and the measuring tank. The pipe connection I is connected to the weir chamber and float tanks at lower levels respectively than those at which the water pipe H is connected to the weir chamber and measuring tank. With this arrangement, any difference in temperature between the water passing through the weir chamber and the water in the measuring tank tends to set up a gravity circulation of water through the float chamber, to thereby minimize the difference in temperature.

In the modification shown in Fig. 2, the float chamber DA is provided with a central measuring compartment or chamber D' and a surrounding chamber D², the chambers D' and D² being in open communication at their upper ends, as through ports D³. The compartment D' is connected to the inlet compartment of the weir chamber by a horizontal pipe connection HA, and GA represents a vapor equalizing pipe connection between the upper end of the measuring tank DA and the vapor space of the weir chamber. The upper end of the compartment D² in this form of my invention receives hot water through the pipe KA, which is connected at its supply end to a tray L located in the heating chamber B, and the lower end of the compartment D² is connected by the pipe IA back to the heater, or as shown, to the inlet compartment of the weir chamber. With the arrangement shown in Fig. 2, a portion of the water passing over the usual heating trays B³ will fall on to the tray L and will flow out of the heater proper to the measuring tank through the pipe KA. The tray L is located appreciably above the maximum height of water level in the weir chamber and this insures, of course, a more energetic circulation through the compartment D² of the measuring tank DA than it is possible to obtain through the single compartment of the measuring tank D with the arrangement shown in Fig. 1. The hot water thus caused to flow through the compartment D² tends to maintain a temperature within the measuring compartment D' which corresponds very closely to the temperature of the water passing through the weir chamber.

In the modification shown in Fig. 3, the float chamber DB may be similar in construction to the float chamber DA of Fig. 2; but in Fig. 3 the compartment D² is intended to be kept full of steam drawn from the weir chamber through the equalizing connection J. M represents a discharge pipe for water of condensation forming in the chamber D², the discharge of water of condensation being regulated by a suitable trap, such as the seal trap M' shown.

Preferably, as shown in each construction illustrated, valves J are provided in the various pipe connections leading to the measuring tank to enable the tank to be cut off from the weir chamber when this is desired for any reason.

While in accordance with the provisions of the statutes, I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. Liquid measuring apparatus comprising in combination, a weir chamber having an inlet compartment and a weir over which liquid may flow out of said inlet chamber, a measuring tank having a measuring compartment, conduit means connecting said compartments for equalizing the liquid levels therein, and other conduit means connecting said weir chamber and tank for equalizing the temperatures therein.

2. Liquid measuring apparatus comprising in combination, a weir chamber having an inlet compartment and a weir over which liquid may flow out of said inlet chamber, a measuring tank having a measuring compartment, two pipe connections between said compartments one opening to each compartment at levels below those respectively at which the other pipe connection opens thereto and each opening to each compartment at a level below the liquid level normally prevailing therein.

3. Liquid measuring apparatus comprising in combination, a closed weir chamber and a weir therein dividing said weir chamber into inlet and outlet compartments, a closed measuring tank having a measuring compartment, two pipe connections between said inlet compartment and said measuring compartment one opening to each compartment at levels below those respectively at which the other pipe connection opens thereto, and each opening to each of said compartments at a level below the liquid level normally prevailing therein, and a vapor equalizing connection between said weir chamber and measuring tank opening to each above the liquid level normally prevailing therein.

JOSEPH W. GAMBLE.

Witnesses:
ROBERT G. CLIFTON,
W. ATWOOD MEHARG.